(No Model.)
F. S. GIFFORD.
CHEESE SAFE.
No. 469,692. Patented Mar. 1, 1892.
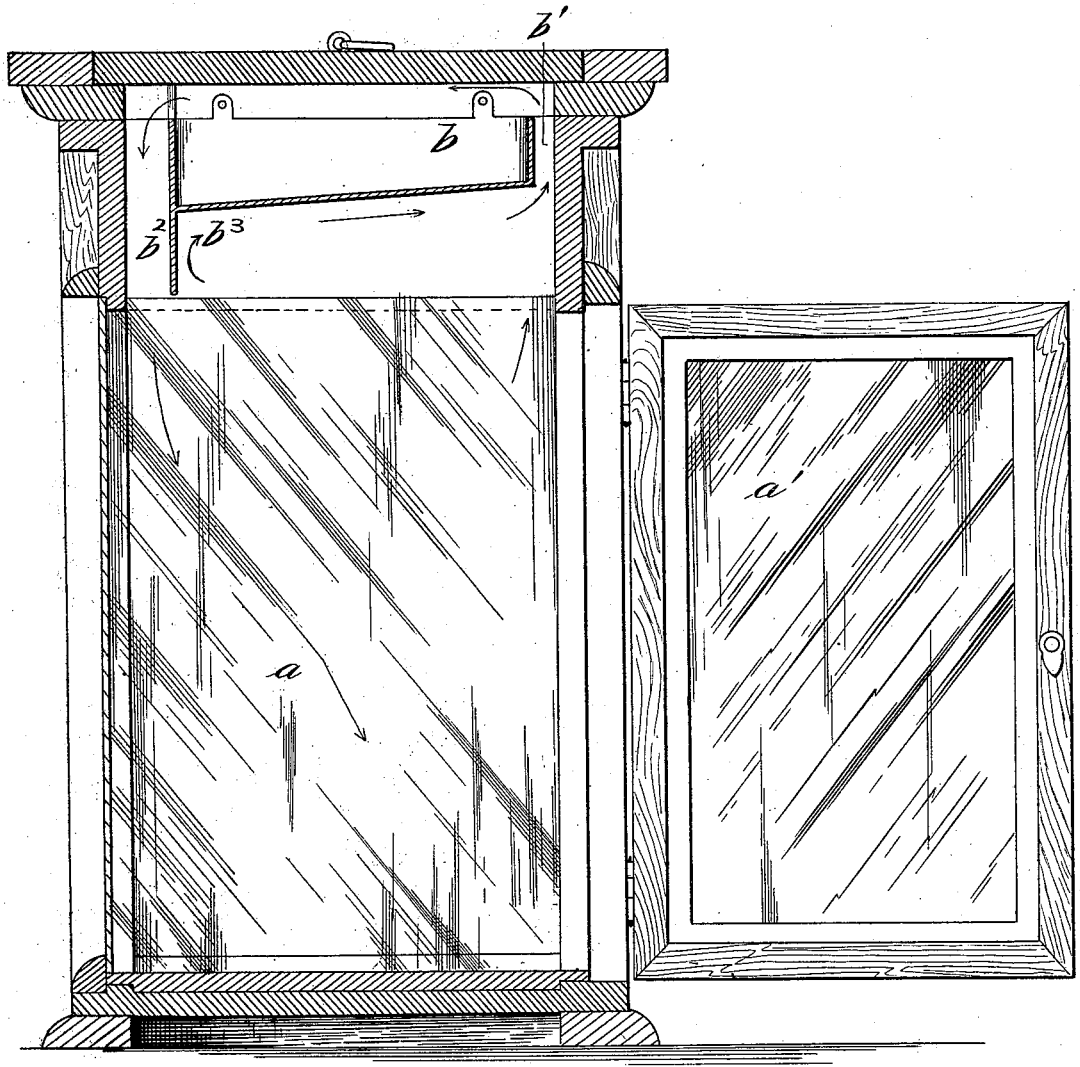
Witnesses:
John R. Snow
James F. Babcock
Inventor
Fred S. Gifford
by his attorneys,
Magnader & Beach
THE NORRIS PETERS CO., PHOTO-LITHO., WASHINGTON, D. C.

UNITED STATES PATENT OFFICE.

FRED S. GIFFORD, OF NEW BEDFORD, MASSACHUSETTS, ASSIGNOR OF ONE-HALF TO ANSEL G. BAKER, OF SAME PLACE.

CHEESE-SAFE.

SPECIFICATION forming part of Letters Patent No. 469,692, dated March 1, 1892.

Application filed June 15, 1891. Serial No. 396,301. (No model.)

*To all whom it may concern:*

Be it known that I, FRED S. GIFFORD, of New Bedford, in the county of Bristol and State of Massachusetts, have invented a new and useful Improvement in Apparatus for Keeping Cheese and other Articles Moist, of which the following is a specification, reference being had to the accompanying drawings, showing a section of one form of apparatus for use when my invention is practiced.

My invention is an apparatus for use in keeping moist cheese, bread, pastry, cigars, and other commodities.

My invention consists in the combination of a box or the like having a door with a pan mounted within the box, with a passage between sides of the pan and box, there being a lip projecting below the pan opposite the door, so that when the door is shut the air is driven against the lip, whence it is driven around the pan and down upon the articles below the pan. By directing currents of moist air from above downwardly I am enabled to keep the air in the chamber holding the articles uniformly moist, and this is a matter of very great importance, because it results in keeping the articles uniformly moist.

In the drawings, $a$ is a closed chamber to contain any article to be kept moist and to hold the air moist, and $b$ is a pan at the upper part of the case to contain water. Passages $b'$ $b^2$ are provided at two opposite sides of the pan for the passage of the moist-air currents which are established every time the door $a'$ is closed, the air being driven through passage $b'$ over the water in the pan $b$ and down passage $b^2$ upon the articles in the chamber $a$. The pan $b$ is provided with a depending lip $b^3$ on its side $b^2$ opposite the door, and the bottom of pan $b$ is inclined from side $b'$ next the door to its farther side $b^2$ to insure the establishment of the air-currents up passage $b'$, over the water in the pan, and down passage $b^2$ into chamber $a$. It will now be readily seen that in this way the atmosphere of chamber $a$ is kept substantially uniformly moist and that the articles in the upper part of the chamber are as moist as those in the lower parts of the chamber, and this I have demonstrated by numerous careful experiments and also by actual practice.

I am aware of Winship's patent, No. 16,320, dated December 23, 1856, and Bluhm's patent, No. 365,901, dated July 5, 1887, and disclaim all that is set forth in them.

What I claim is—

In a receptacle for preserving cheese and other commodities, the combination of a case, a hinged door thereto, a pan, and a deflector secured to the pan, the pan being mounted within the case with two opposite sides against walls of the case and with its other two opposite sides at a distance from walls of the case to provide air-passages, one air-passage being on the door side of the pan and the other air-passage on the opposite side of the case and the deflector projecting downwardly from that bottom corner of the pan which is opposite the door to direct currents along under the bottom of the pan to that air-passage nearest the door, thence over the pan, and thence downwardly into the case through the other air-passage, all substantially as and for the purpose set forth.

FRED S. GIFFORD.

Witnesses:
 THEO. MACK,
 HERBERT E. CUSHMAN.